Figure 1:
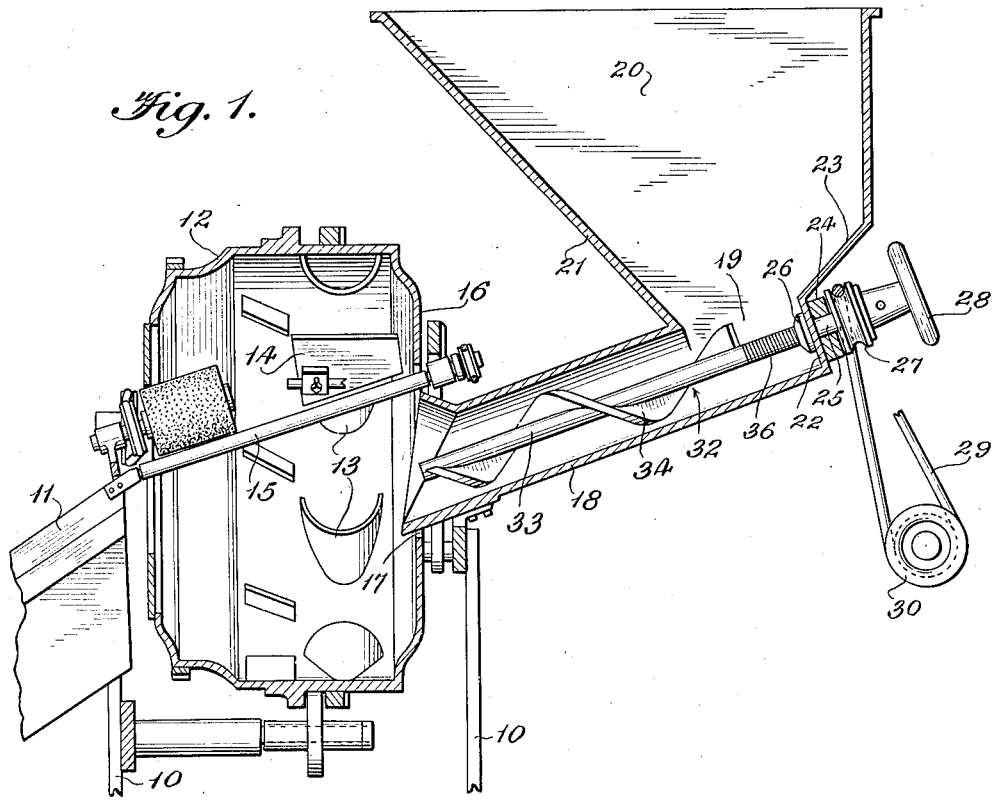

Nov. 10, 1936.	B. D. GREENLAW	2,060,569

NONJAM SCREW FEED

Original Filed May 14, 1931

Inventor:
Burpee D. Greenlaw.

By H. S. Woodward,
Attorney

Patented Nov. 10, 1936

2,060,569

UNITED STATES PATENT OFFICE 2,060,569

NONJAM SCREW FEED

Burpee D. Greenlaw, Fitchburg, Mass., assignor to The Brown Bag Filling Machine Company, Fitchburg, Mass., a corporation of Massachusetts Original application May 14, 1931, Serial No. 537,468. Divided and this application October 3, 1934, Serial No. 746,729

3 Claims. (Cl. 198—64)

This application is a division of my application Serial Number 537,468, for Stock feeding mechanism for packaging machines, filed May 14, 1931, now Patent No. 2,015,892, dated October 1, 1935.

The invention herein has for an object to present a novel form of screw feed for stock of various kinds, and particularly to give a helicoidal screw feed that will be liable in a minimum degree to excessive friction between the screw element itself, and the material being propelled, and the trough or casing in which it operates. A difficulty in feed devices of this kind and a source of excessive wear and waste of power energy is the fact that many materials which it is desired to feed (such as nails, grain, coal, ashes and various manufactured articles, or materials of broken, comminuted or chopped form), include particles or parts which become wedged between the edge of the helicoidal element and the conforming surfaces of the trough or casing, tending to act as a brake and wear or gouge the material of the trough or case, as well as putting an excessive strain and wear on the bearings of the screw, and requiring the use of a motor or other power source with a large margin of excess power over normal requirements. Thus, in a nail packing machine in which my device has been successfully used, where the screw is extended across the bottom of a hopper or along a slightly inclined conduit, the nails tend to rest on the bottom of the hopper and conduit, and the points of some of the nails become engaged between the edge of the vane of the screw and the lower part of the hopper and conduit and to wedge therein so that if the screw were carried on a fixed axis the nails would become tightly jammed between the screw and wall of the conduit, obstructing movement of the screw and damaging the conduit—in fact, making it impracticable to use a helicoidal screw for such use without an expedient corresponding to that here disclosed.

A further important object is to evolve a form of such feed from hoppers and chutes of very heavy materials with a minimum expenditure of power in driving the screw beneath the weight of a large stock of material in the hopper or chute. Thus where a screw extends across the bottom of a hopper the entire weight of nails vertically above the upper parts of the vanes, opposes their movement to a large extent and the extension of the screw entirely across the bottom of this load involves a considerable waste of power.

I have found it possible to materially reduce the power expended in this way and to utilize gravity in large part to effect the movement of the stock from the hopper.

A further purpose is to effect a great simplification in the mounting of feed screws of this nature to the end that simpler journalling is attained, and lowered cost for parts and assemblage effected, where an adequate journalling is provided.

Additional objects, advantages and features of invention reside in the construction, arrangement and combination of parts as will appear from the following description and accompanying drawing, wherein Figure 1 is a sectional view of a nail packaging machine in which my invention is embodied.

Figure 2:
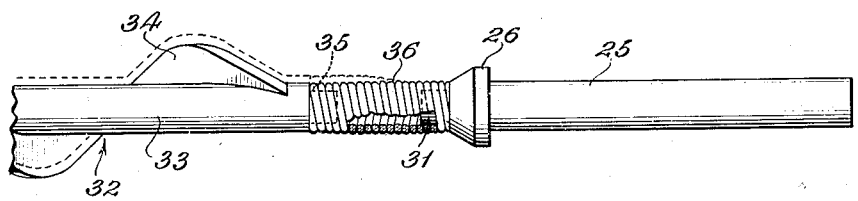

Figure 2 is a detail fragmentary elevation of the screw element, detached, showing a modification of the screw in which the vane is tapered to merge with its shaft at the upper or receiving end.

There is illustrated a nail packaging machine including a frame 10, carrying a nail chute 11, to which nails are fed from a rotary drum 12 by means of the buckets 13 therewithin, fender plates 14 and chute rolls 15, the latter comprising virtually an extension of the chute 11, all constructed and operated as set forth in my prior application aforesaid. These comprising no essential part of the present invention are not described in detail and are set forth to indicate the principal utility to which my present invention has been applied. The back heads 16 of the drum 12 is formed with an axial receiving opening 17 into which there is set the flared discharge end of a cylindrical conveyor chute 18, which is continued from the throat 19 of a large hopper 20. The sides of the hopper 20 all slope to the throat, the bottom of the hopper being substantially U-shaped, its lower part forming a continuation of the lower half of the cylindrical chute 18. The top side of this chute begins at the forward side of the throat where the front wall 21 of the hopper terminates flush with this beginning of the chute. At the rear end of the throat there is formed a back or end wall 22 of the chute and throat, in a plane at right angles to the axis of the chute, from the upper part of which the back inclined wall 23 of the hopper extends. On this wall 22 there is fixed a bearing 24 in which there is journalled a shaft 25 having a preferably integral collar 26 at its forward end, the rear end of the shaft projecting from the bearing a distance and having a pulley 27 fixed thereon next the bearing as well as a hand wheel 28 at the extremity of the shaft. The axis of the shaft is preferably a little below the axis of the chute 18. The shaft is operated by means of a belt 29 and pulley 30, from any suitable source of power. Other operative connections may of course be employed in place of the belt and pulley.

The forward end of the shaft is formed with a tenon 31 projecting a very short distance into the throat 19. A helical screw element 32 extending throughout the chute 18 is provided as a continuation of the shaft 25, this comprising essentially the shaft proper 33, and a single spiral vane 34 formed thereon. The radius of the vane is less than the radius of the passage within the tube 18 so that it may be positioned with a substantial clearance entirely around the screw within the chute 18. The rear end of the shaft 33 is formed with a tenon 35 similar to the one 31, and fitted tightly on these tenons are respective ends of a spring shaft section 36, which serves to support the screw element and to drive it adequately. The ends of the section 36 may be welded or otherwise secured or fixed on the respective shaft elements. This spring shaft section may comprise two or more helical springs so coiled as to lie concentric to the axis of the shafts and closely fitted to each other so that the spring section is closed against access of articles or particles thereinto. By forming it of a plurality of springs, it is given more strength both torsionally and transverse to its axis than by the use of a single wire, without increasing the diameter of wire used. The length of the spring section may be varied as desired, but for a straight line feed it may be in the proportion shown. In this instance, the helicoidal vane 34 begins somewhat more than half way across the throat 19 from the back wall 22, and may have a radial termination as shown in Figure 1 or may be tapered or reduced in radius so that its outer edge terminates at the shaft 33, as in Figure 2, if desired.

In the use of this device, the shaft is rotated in the direction of spiral inclination of the vane upwardly, which tends to propel materials toward the outer end of the tube chute 18. By reason of the inclination of the bottom of the throat and the chute 18 and the arrangement of the hopper thereover, the contents of the hopper are moved by gravity toward the entrance to the tube 18 and by stopping the vane near this entrance instead of extending it entirely across the throat, much weight is removed from the screw at this part, and the body of the stock above the throat will not have to be lifted and will not oppose the rotation of the vane to so great an extent.

In the event that a nail or particle of stock becomes wedged under the advancing edge of the vane, when the pressure exceeds the force of the spring tending to keep the screw in its normal axis, the spring section will bend. Should the particle be near the lower end of the screw, there will be simply a slight pivotal movement of the screw with respect to the shaft 25, but if the particle is near the upper end of the screw, the screw may yield so as to be offset more or less translationally with respect to the axis of the shaft 25, as dotted in Figure 2, and may move pivotally on various centers, as will be understood. In either instance, the resistance to rotation of the screw will be reduced and freeing of the nail or particle facilitated, so that it will ordinarily result by movement of stock in the chute. Likewise, should particles or articles become caught between the vane and the end edge or angle of the chute at the top, the screw will yield away therefrom and permit them to be cleared from the angle by movement down toward the bottom where they may work from between the vane edge and chute wall.

The inclination of the chute 18 is preferably such that the stock tends to gravitate therethrough from the hopper, and the screw vane is of such pitch or inclination that it forms an angle of less than 45 degrees to a plane through the longitudinal axis of the screw. In other words, the pitch of the screw may be said to be exceeding long as compared to prior practice in feed screws or worms of this type. As a result of the inclination of the chute 18 and the long pitch of the screw, the tendency of the stock to gravitate in the chute will serve to aid in the rotation of the screw materially, and the screw will serve principally to retain the stock and prevent it from moving too fast through the chute. The driving means for the screw being connected to a part of machinery having a fixed rate of movement, therefore becomes a regulatory means unless the stock requires force to move it other than gravity. However, as nails tend to form jams in places like the throat 19, the screw will serve additionally to insure movement of nails into and through the throat to the chute.

I claim:—

1. In a bulk stock feed device, a cylindrical conduit having a receiving and a delivery end, means to supply stock to the receiving end thereof, a feed device in the conduit comprising a shaft journalled on a fixed axis outwardly of the receiving end of the conduit, means to rotate the shaft, a helicoid of substantially smaller radius than the conduit interior and revoluble therein, said shaft and helicoid having proximal portions spaced axially apart a substantial distance, and a resilient concentric flexible shaft fixed upon said proximal portions and tending to normally lie on the axis of said shaft and to support said helicoid on the same axis, the spacing of said proximal portions of shaft and helicoid being proportioned so that the helicoid may be displaced from its normal axis translationally and variously.

2. The structure of claim 1 in which said shaft and said helicoid are formed with axially spaced apart tenons, and said flexible shaft comprises a plurality of close coils of resilient wire formed with a common radius and having their end convolutions snugly engaged and fixed around said tenons respectively whereby to fix the coils on the shaft and on the helicoid.

3. The structure of claim 1 in which the said conduit is inclined so that stock tends to move longitudinally therein by gravity, said means to supply stock having a throat portion with a bottom forming an alined continuation of the lower part of the conduit across the throat, said helicoid extending into the throat a distance and being tapered to a termination intermediately of the throat along the axis of the helicoid, said shaft extending into the throat and stopping short adjacent the side of the throat opposite the conduit and said flexible shaft extending across the major part of the space between the said termination of the helicoid and said side of the throat, and affording a substantial space thereunder for reception of stock.

BURPEE D. GREENLAW.